US007146518B2

United States Patent
Saiki

(10) Patent No.: US 7,146,518 B2
(45) Date of Patent: Dec. 5, 2006

(54) FILTER CIRCUIT WITH AUTOMATIC ADJUSTMENT OF CUTOFF FREQUENCY VIA AVERAGE SIGNAL VALUES

(75) Inventor: Eiichi Saiki, Oita (JP)

(73) Assignee: Texas Instruments Incorporated, Dallas, TX (US)

( * ) Notice: Subject to any disclaimer, the term of this patent is extended or adjusted under 35 U.S.C. 154(b) by 508 days.

(21) Appl. No.: 10/142,311

(22) Filed: May 9, 2002

(65) Prior Publication Data

US 2002/0196076 A1 Dec. 26, 2002

(51) Int. Cl.
*G06F 1/04* (2006.01)
(52) U.S. Cl. ...................................... 713/500; 713/503
(58) Field of Classification Search ................ 713/500, 713/503
See application file for complete search history.

(56) References Cited

U.S. PATENT DOCUMENTS 5,506,542 A * 4/1996 Hamano et al. ............ 327/558
5,703,852 A * 12/1997 Kumagai ................... 369/53.3
6,675,314 B1 * 1/2004 Yamada et al. ............. 713/600

* cited by examiner

*Primary Examiner*—Lynne H. Browne
*Assistant Examiner*—Tse Chen
(74) *Attorney, Agent, or Firm*—William B Kempler; W. James Brady; Frederick J. Telecky, Jr.

(57) ABSTRACT

A low-pass filter in a read channel, having an adjustable cutoff frequency has a low-pass filter 14, a time measuring circuit 15, a storage computing circuit 19 and a current supply circuit 18. The time measuring circuit 15 computes the pulse number of a reference clocking signal. The storage computing circuit 19 obtains the mean value of first and second set values that correspond to current values of the control current when the pulse number of the reference clocking signal increases by 1, and the current supply circuit 18 supplies a control current equivalent to the mean value to the low-pass filter 14. Therefore, even if the same pulse number is computed more than once, the desired current set value can be obtained from the mean value of the first and the second set values, and a control current amount that corresponds to said current set value can be supplied. Consequently, even if the frequency of the reference clocking signal is low, the cutoff frequency can be finely set by finely setting the value of the control current.

4 Claims, 2 Drawing Sheets

FILTER CIRCUIT WITH AUTOMATIC ADJUSTMENT OF CUTOFF FREQUENCY VIA AVERAGE SIGNAL VALUES

FIELD OF THE INVENTION

The present invention pertains to the technical field of filter circuits. In particular, it pertains to a filter circuit that is used for the read channel of a MOD (magnetic optical disk).

BACKGROUND OF THE INVENTION

Conventionally, in the signal processing of a MOD, an IC called read channel has been used. Key 111 in FIG. 4 indicates a read channel. This read channel 111 comprises an amplifier 102 and a low-pass filter 103.

When information in a MOD is read out, a photo pickup, which is not illustrated, generates a photo-current that corresponds to the information written in the MOD, and the photo-current is first converted to a voltage by an I-V amplifier 110, and then is output to the amplifier 102 in the read channel 111. This voltage is amplified by the amplifier 102, has a waveform reproduced with noise in the high band removed by the low-pass filter 103, and then is output to the signal processing circuit 104 in a later stage.

For this low-pass filter 103, a linear phase filter such as a Bessel filter or a ripple filter is used. The configuration is such that group delay characteristics will be flat within the pass band of the filter, and such that no distortion will be generated in the output waveform. Therefore, by inputting a pulse signal in the low-pass filter 103 and measuring the delay time, a cutoff frequency can be obtained.

In this manner, with a low-pass filter incorporated in an IC, the cutoff frequency would vary due to a variation in each element. Thus, in the prior art, the delay time and the frequency characteristics of each low-pass filter were measured before the IC chip was sealed in a package, and an appropriate cutoff frequency was set for each element by cutting off the fuse or in some other way.

However, as the delay time and the frequency characteristics were measured by a probe placed in contact with the terminal of each IC chip, the following problems existed: errors due to noise were significantly large; and when the IC chip was sealed in the package after completing the measurement, characteristics such as the delay time and the frequency characteristics would change from the measured characteristics because of stress at the time of sealing, thus the set cutoff frequency would no longer have an appropriate value.

The present invention was created to resolve the aforementioned problems of the prior art. The object is to offer a filter circuit with which an appropriate cutoff frequency can be automatically set at each element.

SUMMARY OF INVENTION

To resolve the aforementioned problems, the filter circuit of one aspect of the present invention comprises a low-pass filter wherein the delay time between an input signal and output signal changes corresponding to a control current; a time measuring circuit, which inputs a reference clocking signal, the aforementioned input signal and the aforementioned output signal and measures the aforementioned delay time as a pulse number of the aforementioned reference clocking signal; a set value changing circuit that either increases or decreases a set value corresponding to the aforementioned input signal and outputs it; a first storage circuit, which, when the pulse number of the aforementioned reference clocking signal measured by the aforementioned time measuring circuit reaches a first value, stores the aforementioned set value output from the aforementioned set value changing circuit; a computing circuit, which obtains the mean value of the first set value stored in the aforementioned first storage circuit and the aforementioned set value output from the aforementioned set value changing circuit; a selective output circuit, which inputs both the aforementioned mean value output from the aforementioned computing circuit and the aforementioned set value output from the aforementioned set value changing circuit, outputs the aforementioned mean value when the pulse number of the aforementioned reference clocking signal measured by the aforementioned time measuring circuit reaches a second value, and otherwise, outputs the aforementioned set value output from the aforementioned set value changing circuit; and a current supply circuit, which supplies the aforementioned control current corresponding to either the aforementioned mean value or the aforementioned set value output from the aforementioned selective output circuit to the aforementioned low-pass filter; and the aforementioned control current is set to a value that corresponds to the aforementioned mean value output from the aforementioned selective output circuit.

Also, in accordance with another aspect of the invention, the filter circuit of the present invention comprises a frequency divider, which divides the aforementioned reference clocking signal and supplies it as the aforementioned input signal to the aforementioned low-pass filter.

Also, in accordance with a further aspect of the invention, in the filter circuit of the present invention, the aforementioned time measuring circuit comprises a first NAND circuit that inputs the aforementioned reference clocking signal, the aforementioned input signal and the aforementioned output signal, and a counter that operates corresponding to the output signal of the aforementioned first NAND circuit; and the aforementioned set value changing circuit comprises a second NAND circuit that inputs the aforementioned input signal and the aforementioned output signal, and a counter that operates corresponding to the output signal of the aforementioned second NAND circuit.

According to an aspect of the present invention, the cutoff frequency of the low-pass filter can be adjusted by, for instance, generating an input signal (inspection signal) from a reference clocking signal that is essential to operation, inputting the inspection signal in the low-pass filter, measuring the delay time of the low-pass filter automatically before normal operation, and setting the measured delay time at an appropriate value. Therefore, unlike the prior art wherein the cutoff frequency was not a correct value after sealing because the cutoff frequency was set to a certain level by cutting off the fuse or in another way before sealing the IC chip in, a cutoff frequency that is in line with the state immediately before operation can always be set.

Furthermore in accordance with an aspect of the present invention, for instance, if the frequency of the reference clocking signal is low and the increment of the delay time is small compared to the cycle of the reference clocking signal, even if the delay time is changed by changing the control current, the same pulse number will be counted several times in the time measuring circuit. At this time, by setting the first and the second set values at a pulse number that is larger or smaller by 1 than the predetermined pulse number, and by setting the mean value of the obtained first and second set values as the current set value, a current set value of the desired control current when the predetermined pulse number is counted will be obtained as a value in the middle of the first and the second set values, and a control current amount that is equivalent to the set current value can be supplied to the low-pass filter. Therefore, even when the frequency of the reference clocking signal is low and the period of the reference clocking signal pulse is large, the cutoff frequency can be adjusted finely by adjusting the delay time of the low-pass filter more finely by setting the control current more finely than in the prior art.

REFERENCE NUMERALS AND SYMBOLS AS SHOWN IN THE DRAWINGS

3 Filter circuit
14 Low-pass filter

DESCRIPTION OF THE EMBODIMENTS

Figure 1:
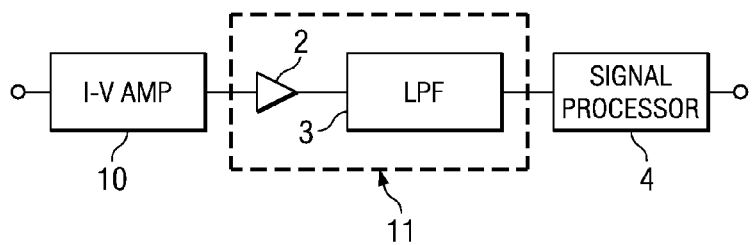
FIG. 1 is a block diagram to illustrate the read channel in an embodiment of the present invention.

Next, an embodiments of the present invention will be explained in reference to drawings. Element 11 in FIG. 1 indicates a read channel used for the signal processing of a MOD. This read channel 11 comprises both an amplifier 2 and a filter circuit 3.

When the information written in the MOD is read out using this read channel 11, a photocurrent of the magnitude equivalent to the information written in the MOD is generated by a photo-pickup, which is not illustrated. The photocurrent, after being converted to a voltage by the I-V amplifier 10, is output to the amplifier 2 in the read channel 11. This voltage is amplified by the amplifier 2, has a waveform reproduced with high band noise elements removed by the filter circuit 3, and this is output to the signal processing circuit 4 in a later stage.

Figure 2:
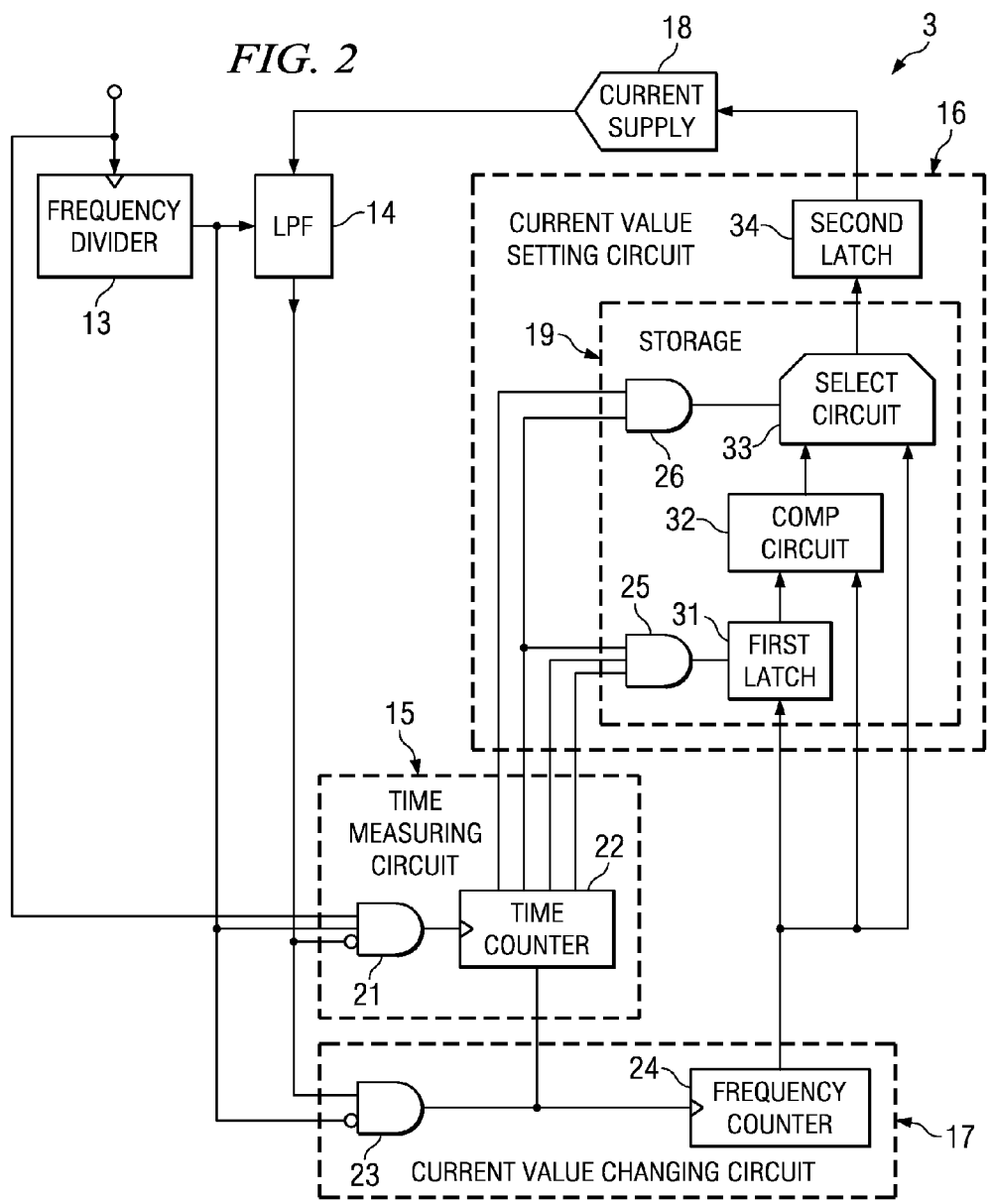
FIG. 2 is a diagram to explain the filter circuit in an embodiment of the present invention.

The configuration of the filter circuit 3 used in the aforementioned read channel 11 is illustrated in FIG. 2. This filter circuit 3 comprises a low-pass filter 14, a current supply circuit 18, a frequency divider 13, a time measuring circuit 15, a current value setting circuit 16, and a current value changing circuit 17. Of these, the frequency divider 13 is an example of the signal output circuit of the present invention.

The filter circuit 3, before starting normal operation, sets a delay time and cutoff frequency of the low-pass filter 14. In the aforementioned filter circuit 3, the operation of setting an appropriate cutoff frequency before starting normal operation will be explained next.

The current value changing circuit 17 comprises a frequency counter 24. In the frequency counter 24, an initial value of the current set value, which is digital data, is stored, and the initial value is output to the current supply circuit 18 through the current value setting circuit 16.

In the current supply circuit 18, correspondence between the current set value, which is digital data, and the current value is made, and when a current set value is input, the current supply circuit 18 supplies a control current value that corresponds to the value to the low-pass filter 14. Here, the initial value of the current set value has been input, and a control current magnitude corresponding to the initial value is supplied to the low-pass filter 14.

The low-pass filter 14 consists of a Gm filter, and is configured so that when the value of the control current increases, the delay time will increase and the cutoff frequency will decrease. When a control current is supplied, delay time is set corresponding to the magnitude of the control current.

After the delay time of the low-pass filter 14 is temporarily set in this manner, a fixed frequency of reference clocking signal is output to the frequency divider 13. The reference clocking signal, after being divided by the frequency divider 13, is output as the inspection signal to the low-pass filter 14. This inspection signal is a pulse-form signal, and after being delayed by the low-pass filter 14, is output to the current value changing circuit 17 and the time measuring circuit 15. Hereafter, this output signal will be called the inspection output signal.

Besides the aforementioned frequency counter 24, the current value changing circuit 17 comprises second gate circuit 23. This second gate circuit 23 outputs a count signal during the period from when the inspection signal is input to the low-pass filter 14 until it is output as an inspection output signal. This count signal is, as a result, a pulse-form signal.

When the pulse-form count signal is output to the frequency counter 24, the current set value stored in the frequency counter 24 will increase by 1, and be output to the current value setting circuit 16. The current value setting circuit 16 comprises both a storage computing circuit 19 and second latch circuit 34, which will be described later. The current set value from the current value changing circuit 17 is input to the storage computing circuit 19. When the pulse of the inspection signal is output, and one count signal is output, the value of the current set value stored by the frequency counter 24 will be a value obtained by adding 1 to the current set value, which has previously been stored. This value will be input to the storage computing circuit 19.

The storage computing circuit 19 comprises first latch circuit 31, the computing circuit 32 and the selective output circuit 33. The current set value output to the storage computing circuit 19 is input respectively to the first latch circuit 31, the computing circuit 32 and the selective output circuit 33.

Of these, the first latch circuit 31 is controlled by the third gate circuit 25, which will be described later, and when the third gate circuit 25 changes from a state of outputting a storage authorizing signal to a state of not outputting it, the first latch circuit 31 stores the current set value output from the frequency counter 24.

Further, in the computing circuit 32, both the current set value output from the first latch circuit 31 and the current set value output from the frequency counter 24 are input, and the mean value of the value stored in the first latch circuit 31 and the current set value will be generated and output to the selective output circuit 33.

Further, the selective output circuit 33 is controlled by fourth gate circuit 26, which will be described later, and when an output control signal is output from the fourth gate circuit 26, it outputs the mean value output from the computing circuit 32 to the aforementioned second latch circuit 34. On the other hand, if no output control signal is output, it outputs the current set value output from the frequency counter 24 to the second latch circuit 34.

Both the third and the fourth gate circuits 25 and 26, which respectively control the aforementioned first latch circuit 31 and selective output circuit 33 are connected to the time measuring circuit 15. The third and the fourth gate circuits 25 and 26, according to control by the time measuring circuit 15, respectively output the aforementioned storage authorizing signal and output control signal.

This time measuring circuit 15 comprises the first gate circuit 21 and a time counter 22.

Of these, in the respective input terminals of the first gate circuit 21, the inspection signal, the inspection output signal, and the reference clocking signal are input, and the pulse of the reference clocking signal is output in the period of the respective rise time of the inspection signal and the inspection output signal, that is, during the delay time of the low-pass filter.

Each time one pulse of the reference clocking signal is input in the time counter 22, the value stored in the time counter 22 will increase by 1. As this reference clocking signal is output to the time counter 22 during the delay time of the low-pass filter 14, the pulse number (hereafter called time measurement value) of the reference clocking signal stored in the time counter 22 during the delay time will be a value that is equivalent to the delay time. Here, the time measurement value is 4-bit digital data. This time measurement value is output to the storage computing circuit 19. The time counter 22 is reset by the count signal, which is the output signal of the second gate circuit 23.

As mentioned above, the time measurement value output to the storage computing circuit 19 is input to the third and the fourth gate circuits 25 and 26. Each of the third and the fourth gate circuits 25 and 26 comprises three input and two input AND circuits, and to each of the respective input terminals, the value of the lower three bits of the output of time counter 22, the most significant bit value and the least significant bit value are respectively input. Here, in the third and the fourth gate circuits 25 and 26, when the time measurement values are respectively 7 and 9, "1" will be input to all of the respective input terminals, and "1" will be output from them. At this time, the respective "1" output respectively from the third and the fourth gate circuits 25 and 26 will be the storage authorizing signal and the output control signal.

Immediately after the pulse of the first inspection signal has been output, and when the aforementioned current set value is 1 more than the initial value, the time measurement value is pre-set to a value (here, 2 as an example), which is neither 7 nor 9. When the time measurement value is 2 as in this case, no storage authorizing signal will be output from the third gate circuit 25, thus, the current set value will be directly output to the computing circuit 32 from the first latch circuit 31; and in the computing circuit 32, the mean value of the current set value output from the first latch circuit 31 and the current set value output from the frequency counter 24 will be generated and output to the selective output circuit 33.

At this time, since the time measurement value is not 9, no output control signal will be output from the fourth gate circuit 26; and from the selective output circuit 33, the current set value output from the frequency counter 24 will be directly output to the second latch circuit 34, and stored in the second latch circuit 34.

The current supply circuit 18 reads out the current set value stored in the second latch circuit 34, and outputs a control current with a magnitude equivalent to the current set value to the low-pass filter 14.

At this time, the current set value has increased by 1 from the initial value. The control current at this time has an increased amount of current compared to the time when the current set value was the initial value, and the delay time of the low-pass filter 14 will be longer by the increment of the control current.

After that, when the pulse of the next inspection signal is output, and one of the aforementioned pulse-form count signals is output to the frequency counter, the current set value will increase by 1, and the control current will increase by that amount. In this manner, each time one pulse-form count signal is output, the current set value will increase by 1 counting from the initial value. When the current set value increases, the control current will increase by that amount, so the delay time of the low-pass filter 14 will be longer.

When the delay time has increased, and the increment becomes larger than the interval of the pulse of the reference clocking signal, the time measurement value will increase by 1. However, because the frequency of the reference clocking signal is low and the period of the pulse of the reference clocking signal is long, the delay time that increases each time the current set value increases by 1 is short compared to the period of the pulse. As a result, the time measurement value will increase by 1 after the current set value has increased by 1 repeatedly several times. Therefore, if the frequency of the reference clocking signal is low, the same time measurement value will appear several times.

For the time measurement value, an optimum value (hereafter called the optimum time value) that is equivalent to the predetermined delay time has been pre-set. Here, the optimum time value is 8.

When the time measurement value increases by one and increases up to 7, which is a value 1 less than the optimum time value, a storage authorizing signal is output from the third gate circuit 25. Then, in the first latch circuit 31, the current set value output from the frequency counter 24 will be stored.

At this time, an output control signal is not output from the fourth gate circuit 26. Therefore, from the selective output circuit 33, the current set value output from the frequency counter 24 will be directly output from the second latch circuit 34, and a current with a magnitude that is equivalent to the current set value will be supplied to the low-pass filter 14.

While the time measurement value is 7, from the selective output circuit 33, the current set value output from the frequency counter 24 is directly output to the second latch circuit 34 and stored, and in the current supply circuit 18, a control current that corresponds to the stored current set value will be generated and supplied to the low-pass filter 14.

After that, when the time measurement value increases from 7 to the optimum time value of 8, no more storage authorizing signals will be output from the third gate circuit 25. In this manner, when the state changes from a state wherein a storage authorizing signal was output to a state wherein it is not output, the current set value output from the frequency counter 24 at this time will be stored in the first latch circuit 31, and will no longer be renewed thereafter. Therefore, in the first latch circuit 31, the current set value that is input to the first latch circuit 31 when the time measurement value increases from 7 to 8 will be stored as the final value. The current set value that is finally stored in the first latch circuit 31 in this manner is an example of the first set value of the present invention.

At this time, an output control signal is not output from the fourth gate circuit 26, either. Therefore, from the selective output circuit 33, the current set value output from the frequency counter 24 will be directly output to the second latch circuit 34, and a control current with a magnitude equivalent to the current set value will be supplied to the low-pass filter 14.

After that, the time measurement value will further increase by 1, to a value that is 1 more than the optimum time value of 8, that is, 9. In this manner, the current set value output from the frequency counter 24 when the time measurement value increases from 8 to 9 is an example of the second set value in the present invention.

At this time, in the computing circuit 32, a mean value of the current set value stored in the first latch circuit 31, which is the current set value the first set value when the time measurement value increases from 7 to 8, and the current set value (the second set value) output from the frequency counter 24 when the time measurement value increases from 8 to 9 is generated and output to the selective output circuit 33.

When the time measurement value reaches 9, an output control signal is output from the fourth gate circuit 26. Then, from the selective output circuit 33, the mean value of the first and the second set values generated in the computing circuit 32 is output to the second latch circuit 34 and stored as the current set value. The mean value of the first and the second set values is read out in the current supply circuit 18, and control current with a current value that corresponds to the read-out value is supplied from the current supply circuit 18 to the low-pass filter 14.

Figure 3:
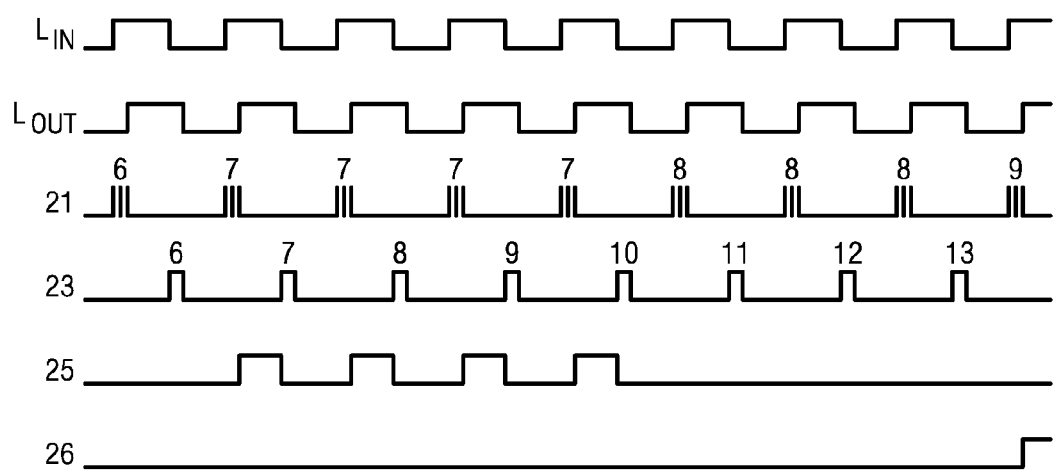
FIG. 3 is a timing chart to explain the operation of the filter circuit in an embodiment of the present invention.
Figure 4:
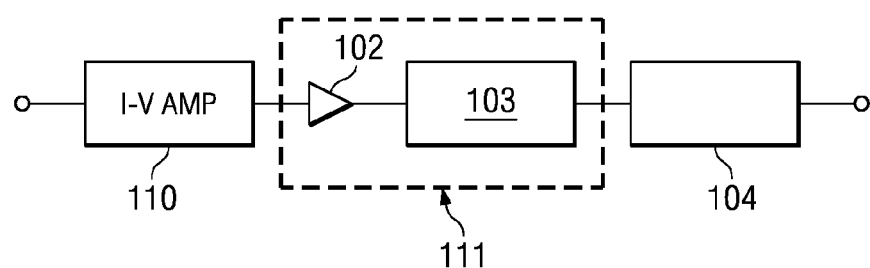
FIG. 4 is a block diagram to explain a read channel of the prior art.

FIG. 3 illustrates an example of the timing chart of the output signals of the first through the fourth gate circuits 21, 23, 25 and 26. In FIG. 3, key $L_{in}$ indicates an inspection signal input to the low-pass filter 14, and key $L_{out}$ indicates an inspection output signal output from the low-pass filter 14. The numbers attached to respective pulses of the output signal of the first gate circuit 21 respectively indicate time measurement values when respective pulses are output. The number attached to each pulse of the output signal of the second gate circuit 23 indicates the aforementioned current set value.

Here, it is assumed that the current set value when the time measurement value increases from 7 to the optimum time value of 8, that is, the first set value of the present invention, is 9. Further, the current set value when the time measurement value increases from 8 to 9, that is, the second set value of the present invention, is assumed to be 13. In this case, a fixed value of control current equivalent to the mean value of the first and the second set values 9 and 13, i.e., 11, will be supplied to the low-pass filter 14.

In this manner, when the output control signal is supplied from the fourth gate circuit 26 to the selective output circuit 33 and the result of computation in the computing circuit 32 is stored in the second latch circuit 34 as the current set value, the selective output circuit 33 will stop the operation and no more signals will be output to the second latch circuit 34. Therefore, the second latch circuit 34 will continue storing the mean value of the aforementioned first and second set values, and the storage contents will no longer be renewed. Therefore, since the mean value of the first and the second set values will be stored in the second latch circuit 34, which will not be renewed, the current value of the control current supplied from the current supply circuit 18 will be fixed at a certain value.

The low-pass filter 14 operates at a fixed cutoff frequency that is determined by the control current that has been fixed at a certain value in this manner. To the low-pass filter 14, the output signal of the amplifier 2 will input, and the process will shift to normal read channel operation.

As explained above, in the present embodiment, the filter circuit 3 sets the cutoff frequency by setting a control current with an appropriate current value each time before normal operation is started. In the prior art, because the cutoff frequency was set only once before the IC chip was sealed in a package, a problem existed in that when the IC chip was sealed in the package, the set cutoff frequency would move from the appropriate frequency due to stress at the time of sealing or the like. In the present embodiment, the delay time immediately before operation starts is measured even after the IC chip has been sealed in a package, so such problem does not exist.

In the present embodiment, the mean value of the first set value, which is the current set value when the time measurement value (here, 7), that is one smaller than the optimum time value increases to the time measurement value of the optimum time value (here, 8), and the second set value, which is the current set value when the time measurement value of the optimum time value (here, 8) increases to the time measurement value (here, 9) that is 1 larger than the optimum time value, is calculated, and control current equivalent to the magnitude of the mean value is generated and supplied to the low-pass filter 14.

The current values of the control currents that respectively correspond to the first and the second set values are approximately equal to the minimum value and the maximum value of the control current when the time measurement value is the optimum time value (here, 8), thus, when the control current is set with the mean value of the first and the second set values, when the time measurement value is the optimum time value, even if more than one control currents exist that have different current values, a current value that is approximately in the middle of those can be selected, and said control current can be supplied to the low-pass filter 14; consequently, even when the frequency of the reference clocking signal is low, the cutoff frequency of the low-pass filter can be finely set.

Although the optimum time value of the time measurement value is set at 8 in the present embodiment, the present invention is not limited to this.

Also, in the aforementioned embodiment, a case was explained wherein the filter circuit was applied to a read channel of a MOD. However, it can also be applied to, for instance, the read channel of a DVD (Digital Video Disk) or hard disk.

The present invention allows the cutoff frequency to be set accurately.

The invention claimed is:

1. A filter circuit for a read channel of a storage device in which a cutoff frequency can automatically be set comprising:

a low-pass filter wherein the delay time between an input signal and an output signal and cut-off frequency changes corresponding to a control current;

a time measuring circuit, which inputs a reference clocking signal, the input signal and the output signal and measures the delay time as a pulse number of the reference clocking signal;

a set value changing circuit that either increases or decreases a set value corresponding to a cycle of the input signal and outputs it;

a first storage circuit, which, when the pulse number of the reference clocking signal measured by the time measuring circuit reaches a first value, stores the set value output from the set value changing circuit as a first set value;

a computing circuit, which obtains a mean value of the first set value stored in the first storage circuit and the set value output from the set value changing circuit;

a selective output circuit, which inputs both the mean value output from the computing circuit and the set value output from the set value changing circuit, outputs the mean value when the pulse number of the reference clocking signal measured by the time measuring circuit reaches a second value being greater than the first value, and otherwise, outputs the set value output from the set value changing circuit; and a current supply circuit, which supplies the control current corresponding to either the mean value or the set value output from the selective output circuit to the low-pass filter;

wherein the mean value, which is output from the selective output circuit when the pulse number of the reference clocking signal is the second value, is the average of the first set value stored in the first storage circuit and a second set value, which is output from the set value changing circuit when the pulse number of the reference clocking signal is the second value, and the control current is set to a value that corresponds to the value output from the selective output circuit to control a cutoff frequency thereof.

2. A filter circuit in accordance with claim 1 further comprising a frequency divider, which divides the reference clocking signal and supplies a divided reference clocking signal as the input signal to the low-pass filter.

3. A filter circuit comprising:

a low-pass filter wherein the delay time between an input signal and an output signal changes corresponding to a control current;

a time measuring circuit, which inputs a reference clocking signal, the input signal and the output signal and measures the delay time as a pulse number of the reference clocking signal;

a set value changing circuit that either increases or decreases a set value corresponding to the input signal and outputs it;

a first storage circuit, which, when the pulse number of the reference clocking signal measured by the time measuring circuit reaches a first value, stores the set value output from the set value changing circuit;

a computing circuit, which obtains a mean value of the first set value stored in the first storage circuit and the set value output from the set value changing circuit;

a selective output circuit, which inputs both the mean value output from the computing circuit and the set value output from the set value changing circuit, outputs the mean value when the pulse number of the reference clocking signal measured by the time measuring circuit reaches a second value, and otherwise, outputs the set value output from the set value changing circuit; and a current supply circuit, which supplies the control current corresponding to either the mean value or the set value output from the selective output circuit to the low-pass filter; whereby the control current is set to a value that corresponds to the value output from the selective output circuit, wherein the time measuring circuit comprises a first NAND circuit that inputs the reference clocking signal, the input signal and the output signal, and a counter that operates corresponding to the output signal of the first NAND circuit; and the set value changing circuit comprises a second NAND circuit that inputs the input signal and the output signal, and a counter that operates corresponding to the output signal of the second NAND circuit.

4. A filter circuit comprising:

a low-pass filter wherein the delay time between an input signal and an output signal changes corresponding to a control current;

a time measuring circuit, which inputs a reference clocking signal, the input signal and the output signal and measures the delay time as a pulse number of the reference clocking signal;

a set value changing circuit that either increases or decreases a set value corresponding to the input signal and outputs it;

a first storage circuit, which, when the pulse number of the reference clocking signal measured by the time measuring circuit reaches a first value, stores the set value output from the set value changing circuit;

a computing circuit, which obtains a mean value of the first set value stored in the first storage circuit and the set value output from the set value changing circuit;

a selective output circuit, which inputs both the mean value output from the computing circuit and the set value output from the set value changing circuit, outputs the mean value when the pulse number of the reference clocking signal measured by the time measuring circuit reaches a second value, and otherwise, outputs the set value output from the set value changing circuit; and a current supply circuit, which supplies the control current corresponding to either the mean value or the set value output from the selective output circuit to the low-pass filter; whereby the control current is set to a value that corresponds to the value output from the selective output circuit, a frequency divider, which divides the reference clocking signal and supplies a divided reference clocking signal as the input signal to the low-pass filter; and wherein the time measuring circuit comprises a first NAND circuit that inputs the reference clocking signal, and input signal and the output signal, and a counter that operates corresponding to the output signal of the first NAND circuit; and the set value changing circuit comprises a second NAND circuit that inputs the input signal and the output signal, and a counter that operates corresponding to the output signal of the second NAND circuit.

* * * * *